UNITED STATES PATENT OFFICE.

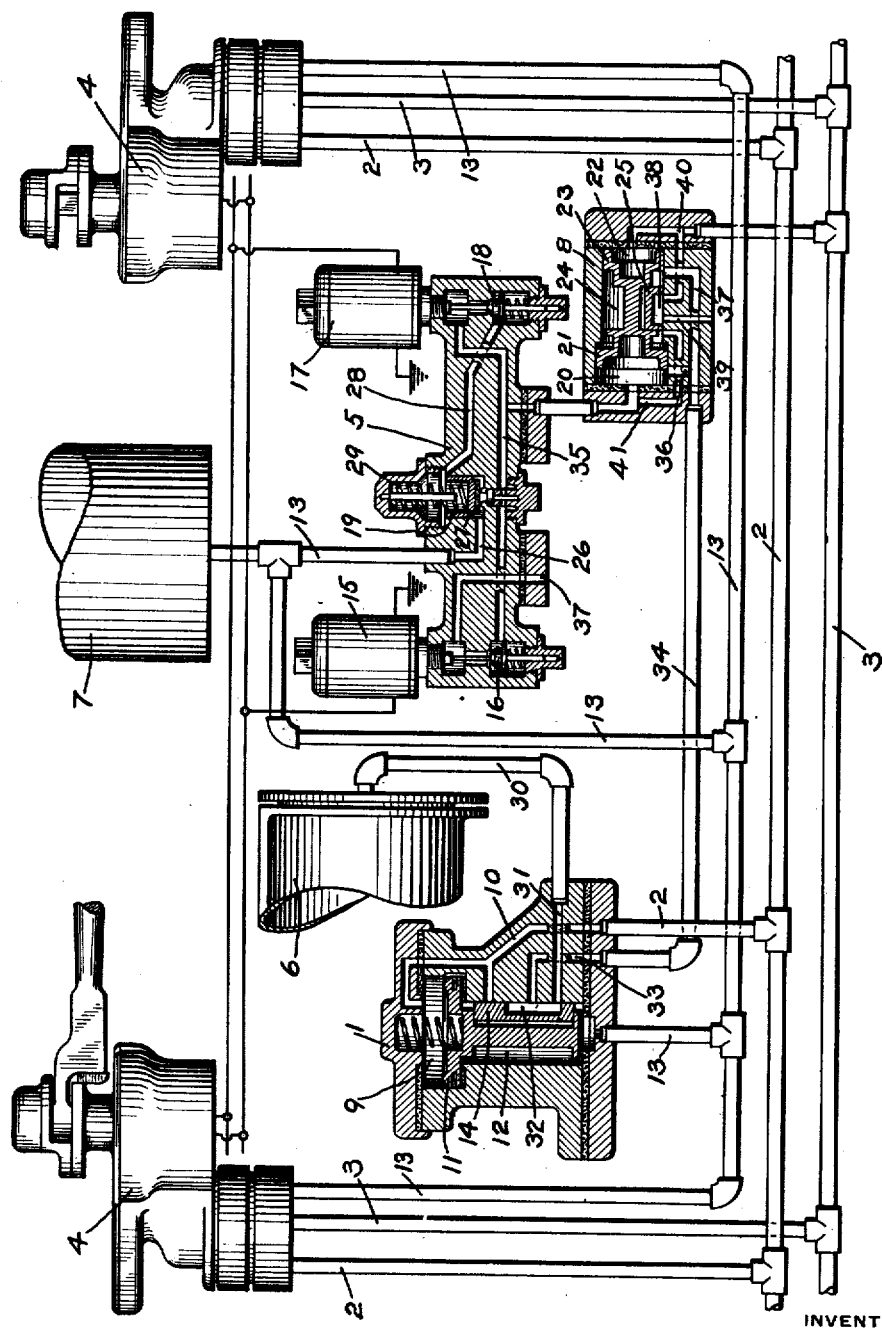

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

1,339,681.     Specification of Letters Patent.     Patented May 11, 1920.

Application filed October 26, 1918. Serial No. 259,774.

*To all whom it may concern:*

Be it known that I, WALTER V. TURNER, a citizen of the United States, residing at Wilkinsburg, in the county of Allegheny and State of Pennsylvania, have invented new and useful Improvements in Electropneumatic Brakes, of which the following is a specification.

This invention relates to fluid pressure brakes, and more particularly to a brake adapted to be controlled electrically as well as pneumatically.

It has heretofore been proposed to provide a brake equipment having means for controlling the brakes electrically and by straight air and in which the straight air pipe is utilized for supplying and releasing fluid under pressure to and from the brake cylinder when the brakes are controlled electrically.

With the above type of brake equipment, if the straight air pipe should break or if the straight air pipe hose couplings should part, the brakes could not be applied electrically, or if already applied, the braking pressure would be lost.

The principal object of my invention is to provide means for overcoming the above difficulty.

If the equipment is provided with an electrically controlled release valve, the improvement also prevents loss of air in case the release valve should happen to stick open.

In the accompanying drawing, the single figure is a diagrammatic view, partly in section, of a car air brake equipment embodying my invention.

As shown in the drawing, the equipment may comprise an emergency valve device 1, an emergency brake pipe 2, a straight air pipe 3, a combined brake valve and switch 4, one at each end of the car, an electric application and release valve device 5, a brake cylinder 6, a main reservoir 7, and a double check valve device 8.

The emergency valve device 1 may comprise a casing having a piston chamber 9, connected by passage 10 to brake pipe 2, and containing a piston 11, and having a valve chamber 12, connected to main reservoir pipe 13, and containing a slide valve 14, adapted to be operated by piston 11.

The electric application and release valve device 5 may comprise a release magnet 15 for operating a release valve 16, an application magnet 17, for operating a pilot valve 18, and a relay valve 19, adapted to be controlled by the pilot valve 18.

The double check valve device 8 may comprise a casing having a piston chamber 20, containing a piston 21, a piston chamber 22, containing piston 23, connected to piston 21, and an intermediate valve chamber 24, containing a slide valve 25.

In operation, the valve chamber 12 of the emergency valve device 1 is charged with main reservoir pressure, supplied through pipe 13, and fluid flows from said valve chamber, through the usual feed groove around piston 11 to piston chamber 9, and thence to the brake pipe 2.

Fluid from the main reservoir also flows from pipe 13, through a passage 26 to the inner face of the relay valve 19 and thence through a restricted port 27 in the valve, to the opposite side. Passage 28 being closed by the pilot valve 18, the fluid pressures upon opposite sides of the relay valve 19 equalize, permitting the spring 29 to hold the valve closed.

In the release position of the emergency valve device 1, the brake cylinder 6 is connected, through pipe 30, passage 31, cavity 32 in slide valve 14, and passage 33, with a pipe 34, leading to the double check valve device 8.

If it is desired to effect an electric application of the brakes, the application magnet 17 is energized to open the pilot valve 18, while the release magnet 15 is deënergized, to close the release valve 16. The opening of valve 18 operates to vent fluid from the spring chamber of the relay valve 19, so that said valve is opened and fluid is supplied from the main reservoir 7, through passage 26 to passage 35 and thence to piston chamber 20 of the double check valve device 8.

The double check valve will be shifted by the fluid pressure supplied to the piston chamber 20 to the position shown in the drawing, if not already in that position, and fluid will then flow through port 36 to passage 37 and pipe 34. From pipe 34 fluid flows through cavity 32 in the emergency slide valve 14 to the brake cylinder 6.

The brakes may be electrically released by energizing the release magnet 15, so as to open the release valve 16 and thus vent fluid from the brake cylinder, through passage 35 to exhaust port 37.

The brakes may be applied by straight air, by moving the brake valve to straight air application position, in which fluid is supplied to the straight air pipe 3 and thence to piston chamber 22 of the double check valve device 8. The double check valve is then shifted to the left, so that piston chamber 22 is opened to passage 37, permitting fluid to flow to the pipe 34 and the brake cylinder 6, to effect a straight air application of the brakes.

In order to assist in maintaining the double check valve in its different positions, a cavity 38 in the slide valve 25 is adapted to connect passage 40 with exhaust port 39 when the double check valve is in its right hand position, or passage 41, leading to piston chamber 20, with said exhaust port when the check valve is in its left hand position.

If the straight air pipe 3 should break or its hose connections should part, the double check valve device 8 will prevent the loss of braking pressure in case the brakes are applied, since if the brakes are applied electrically, the double check valve will be in the position shown in the drawing, with passage 37 cut off from the straight air pipe 3, while if the brakes are applied by straight air, the reduction in pressure in the straight air pipe caused by the breakage of the pipe, will reduce the pressure in piston chamber 22, so that the check valve device will be shifted to the right hand position.

Upon an emergency reduction in brake pipe pressure, the emergency piston 11 will be shifted to emergency position, in which passage 31 is opened to valve chamber 12, so that fluid is supplied from the main reservoir to the brake cylinder.

In the emergency position of slide valve 14, cavity 32 connects passage 10, leading to brake pipe 2, with passage 33, so that upon releasing the brakes after an emergency application, a prompt release may be secured by energizing the application magnet 17, so as to effect the supply of fluid under pressure to pipe 34 and thence through cavity 32 to the brake pipe, thus quickly recharging the brake pipe to a pressure sufficient to effect the release.

It will now be noted, that in this case, as well as those previously mentioned, fluid will be prevented from escaping through pipe 34 to the straight air pipe, in case the straight air pipe is broken.

If the release valve 16 should stick open when the brakes are applied by straight air, the brakes will not be released, because the double check valve device will be shifted by straight air pressure, acting on piston 23, so as to cut off communication from the release valve 16 to the pipe 34.

Having now described my invention, what I claim as new, and desire to secure by Letters Patent, is:—

1. In a fluid pressure brake, the combination with a brake cylinder, brake pipe, straight air pipe, and an emergency valve device operated upon a reduction in brake pipe pressure for supplying fluid to the brake cylinder, of electrically controlled means for supplying fluid to the brake cylinder, and a check valve device for controlling communication from the brake cylinder to the exhaust, from said electrically controlled means to the brake cylinder, and from the straight air pipe to the brake cylinder.

2. In a fluid pressure brake, the combination with a brake cylinder, a straight air pipe, and electrically controlled means for supplying and releasing fluid to and from the brake cylinder, of a double check valve device operated by the flow of fluid from the straight air pipe to the brake cylinder for cutting off communication through which fluid is released from the brake cylinder and by the flow of air in electrically applying the brakes for cutting off communication from the straight air pipe to the brake cylinder.

In testimony whereof I have hereunto set my hand.

WALTER V. TURNER.